US012341649B2

(12) United States Patent
Condon

(10) Patent No.: US 12,341,649 B2
(45) Date of Patent: Jun. 24, 2025

(54) ALTERNATIVES TO ROUTER STATUS LIGHTS

(71) Applicant: DISH Network L.L.C., Englewood, CO (US)

(72) Inventor: Caroline Condon, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 374 days.

(21) Appl. No.: 17/736,940

(22) Filed: May 4, 2022

(65) Prior Publication Data

US 2023/0362052 A1  Nov. 9, 2023

(51) Int. Cl.
*H04L 41/0677* (2022.01)
*G08B 5/38* (2006.01)
*H04L 41/22* (2022.01)
*H04L 43/0811* (2022.01)
*H04L 43/50* (2022.01)

(52) U.S. Cl.
CPC ............ *H04L 41/0677* (2013.01); *G08B 5/38* (2013.01); *H04L 41/22* (2013.01); *H04L 43/0811* (2013.01); *H04L 43/50* (2013.01)

(58) Field of Classification Search
CPC . H04L 41/0677; H04L 41/22; H04L 43/0811; H04L 43/50; H04L 43/0817; G08B 5/38
See application file for complete search history.

(56) References Cited

U.S. PATENT DOCUMENTS 11,688,253 B2 *  6/2023  Hare, Jr. .............. H04B 10/116
340/332

* cited by examiner

*Primary Examiner* — Daryl C Pope
(74) *Attorney, Agent, or Firm* — Seed IP Law Group LLP

(57) ABSTRACT

A method of obtaining status information is disclosed. The method includes transmitting, by a router device, first status information to a network device; determining, by the router device, that the router device is not connected to the network device; causing, by the router device, a light emitting device to output light in an illumination pattern in response to the determining that the router device is not connected to the network device; generating, by a user device, image data corresponding to a plurality of images of the light emitting device while the light emitting device outputs light in the illumination pattern; obtaining, by the user device, second status information based on the image data corresponding to the plurality of images of the light emitting device while the light emitting device outputs light in the illumination pattern; and transmitting, by the user device, the second status information to the network device.

18 Claims, 9 Drawing Sheets

ALTERNATIVES TO ROUTER STATUS LIGHTS

BACKGROUND

Description of the Related Art

Conventional router devices typically include status lights that can be illuminated to indicate various types of information. The status lights may be illuminated in different colors and at different frequencies to indicate different status information. For example, a router device may include a first icon near a first status light that indicates whether the router is receiving power, a second icon near a second status light that indicates whether the router is connected to a Wide Area Network (WAN), a third icon near a third status light that indicates whether the router is using a particular frequency band for a Wireless Local Area Network (WLAN), a fourth icon near a fourth status light that indicates whether a Universal Serial Bus (USB) device is connected to the router, a fifth icon near a fifth status light that indicates a speed of an Ethernet connection. A different router device may include a set of different icons and status lights that indicate information in a different manner.

When there is a problem with a router device, a user may observe the status lights on the router device in an attempt to understand the cause of the problem. However, the user may not be able to obtain status information from the status lights on the router device. For example, the user may not recognize the icons used on the router device, as different routers use different sets of status lights and labels. In addition, the user may have to look up in a user's manual the meaning of each status light and illumination pattern (e.g., continuously on, blinking slowly, blinking rapidly).

Even after looking up the meaning of the illumination patterns, the user may not know what to do to fix a problem with the router device. The user may then call the user's network service provider to seek assistance. During the call, the user may describe to a customer support representative which status lights are on, off, or blinking, and describe in the illumination patterns and color of light emitted by the status lights. The icons near the status lights on the router may be difficult for the user to identify accurately. Also, the user may misidentify the particular color of the light (e.g., bright blue vs. a normal blue). In addition, the user may misidentify the particular illumination pattern of a status light (e.g., one second blinking pattern, two second blinking pattern, three second blinking pattern), which indicate different statuses. Additionally, a relatively small font is used on many routers, which makes icons or labels next to status lights difficult to read.

Accordingly, there is a need to improve how status information is obtained from router devices.

BRIEF SUMMARY

The present disclosure teaches devices, systems, and methods for obtaining status information is from router devices, and communicating the status information to users and customer service representatives. In one or more embodiments, a router device transmits status information and/or diagnostic information via a network to a network device, which converts the information to a user-friendly format and transmits a corresponding easy to understand message to a user device. In one or more embodiments, if the router device determines that it is not able to communicate with the network device, the router device illuminates a status light and signals status information using an illumination pattern of the status light, and the user device captures images of the status light, obtains the status information based on the images, and transmits the status information to the network device. Subsequently, if the router device is able to communicate with the network device, the router device turns off the status light in response to receiving a message from the network device. Accordingly, the status light of the router device is normally turned off, which may provide an improved user experience as status light are not illuminated and/or flashing during normal operation.

A method of obtaining status information according to the present disclosure may be summarized as including: transmitting, by a router device, first status information to a network device; determining, by the router device, that the router device is not connected to the network device; causing, by the router device, a light emitting device to output light in an illumination pattern in response to the determining that the router device is not connected to the network device; generating, by a user device, image data corresponding to a plurality of images of the light emitting device while the light emitting device outputs light in the illumination pattern; obtaining, by the user device, second status information based on the image data corresponding to the plurality of images of the light emitting device while the light emitting device outputs light in the illumination pattern; and transmitting, by the user device, the second status information to the network device.

The method may further include: obtaining, by the network device, diagnostic information based on the second status information; and transmitting, by the network device, the diagnostic information. Also, the method may further include: receiving, by the user device, the diagnostic information transmitted by the network device; and displaying, by the user device, a message based on the diagnostic information. In addition, the method may further include: receiving, by a content receiver device, the diagnostic information transmitted by the network device, the diagnostic information being transmitted via a satellite; and causing, by the content receiver device, a display device to display a message based on the diagnostic information.

The method may further include: receiving, by the network device, the first status information transmitted by the router device; determining, by the network device, that more than a predetermined amount of time has passed after the receiving the first status information transmitted by the router device; and transmitting, by the network device, a message in response to the determining that more than the predetermined amount of time has passed after the receiving the first status information transmitted by the router device. Also, the method may further include: determining, by the network device, that an application is active on the user device, and the transmitting the message may include transmitting the message to the user device in response to determining that the application is active on the user device. In addition, the method may further include: determining, by the network device, that an application is not active on the user device, and the transmitting the message may include transmitting the message to a content receiver device via a satellite in response to determining that the application is not active on the user device.

The method may further include: receiving, by the router device, a message transmitted by the network device; and causing, by the router device, the light emitting device to turn off in response to the receiving the message transmitted by the network device.

A network device according to the present disclosure may be summarized as including: one or more processors; and one or more memory devices storing instructions that, when executed by the one or more processors, cause the network device to: receive first status information from a router device; determine that more than a predetermined amount of time has passed after the receiving the first status information from the router device; transmit a first message to a user device or a content receiver device in response to determining that more than the predetermined amount of time has passed after the receiving the first status information from the router device, the user device and the content receiver device being different from the router device, and the first message requesting a user to aim a camera device of the user device at a light emitting device of the router device.

The instructions stored by the one or more storage devices of the network device, when executed by the one or more processors, may cause the network device to: receive second status information from the user device; obtain diagnostic information based on the second status information received from the router device; and transmit the diagnostic information to the user device or the content receiver device. Also, the instructions stored by the one or more storage devices of the network device, when executed by the one or more processors, may cause the network device to: determine that an application is active on the user device, and the diagnostic information may be transmitted to the user device in response to determining that the application is active on the user device. In addition, the instructions stored by the one or more storage devices of the network device, when executed by the one or more processors, may cause the network device to: determine that an application is not active on the user device, and the diagnostic information may be transmitted to the content receiver device in response to determining that the application is not active on the user device.

The instructions stored by the one or more storage devices of the network device, when executed by the one or more processors, may cause the network device to: transmit a second message to the router device after the second status information is received from the user device, and the second message may cause the router device to turn off the light emitting device.

The instructions stored by the one or more storage devices of the network device, when executed by the one or more processors, may cause the network device to: set or reset a timer in response to receiving the first status information from the router device.

A non-transitory processor-readable storage medium according to the present disclosure may be summarized as storing instructions that, when executed by at least one processor, cause a device to: generate image data corresponding to a plurality of images of a light emitting device while the light emitting device outputs light in an illumination pattern; obtain status information based on the image data; and transmit the status information to a network device.

The instructions stored by the storage medium, when executed by the at least one processor, may cause the device to: determine one or more networks available to transmit the status information to the network device; and select one of the one or more networks available to transmit the status information to the network device, and the status information may be transmitted to the network device using the one of the one or more networks available to transmit the status information to the network device. Also, the instructions stored by the storage medium, when executed by the at least one processor, may cause the device to: display a list including at least one identifier of at least one network that is available to transmit the status information to the network device; and receive a user input corresponding to an identifier of a network that is available to transmit the status information to the network device, the identifier of the network being included in the list displayed by the device, and the status information may be transmitted to the network device in response to receiving the user input. In addition, the instructions stored by the storage medium, when executed by the at least one processor, cause the device to: automatically select the one of the one or more networks based on information indicating that the one of the one or more networks is connected to an external network; and automatically transmit the status information to the network device after the one or more networks is automatically selected.

The instructions stored by the storage medium, when executed by the at least one processor, may cause the device to: receive a message from the network device; and display the message received from the network device, and the message may request a user to aim a camera device at the light emitting device while the light emitting device outputs light in the illumination pattern. Also, the message may include information that identifies a device that includes the light emitting device.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
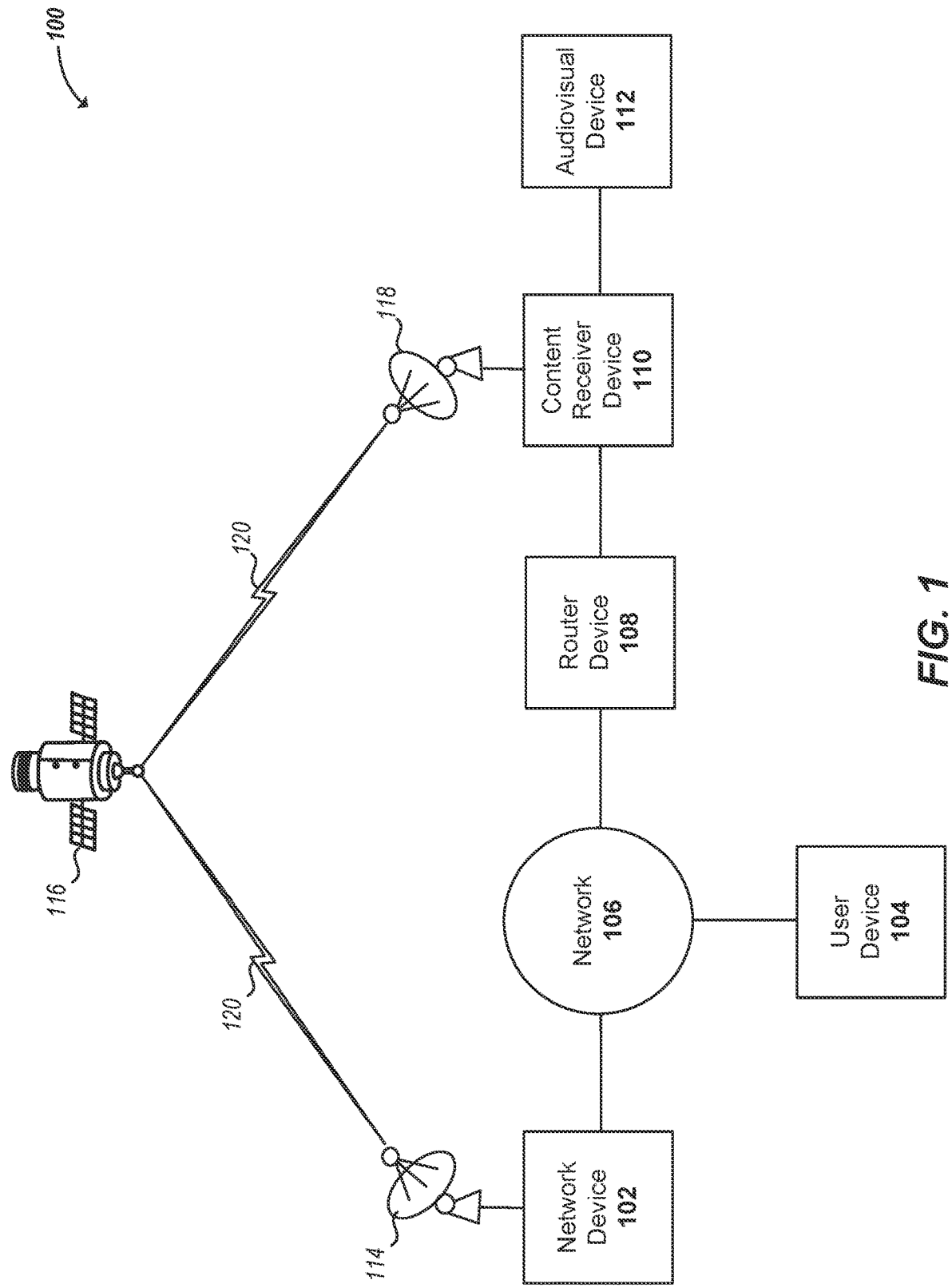
FIG. 1 is a block diagram illustrating a system for obtaining status information in accordance with embodiments described herein.

FIG. 1 is a block diagram illustrating a system 100 for obtaining status information in accordance with embodiments described herein. The system 100 includes a network device 102 and user device 104 that can communicate with each other via a network 106. In one or more implementations, the network device 102 is a server device (e.g., TR-069 server) operated by a network provider. In one or more implementations, the user device 104 is a portable computing device such as a cell phone, laptop computer, or tablet computer. In one or more implementations, the network 106 includes the public Internet.

The system 100 also includes a router device 108, a content receiver device 110, and an audiovisual device 112. In one or more embodiments, the router device 108 includes a modem that modulates signals that are transmitted to the network 106, and demodulates signals that are received from the network 106. Alternatively, the system 100 may include a modem device coupled between the network 106 and the router device 108, which enables the router device 108 to receive data from the network 106 and transmit data to the network 106. In one or more implementations, the content receiver device 110 is configured to receive content via a satellite-based content distribution system. In one or more implementations, the content receiver device 110 is configured to receive content via a cable-based content distribution system. In one or more implementations, the audiovisual device 112 is a television.

In one or more embodiments, the system 100 includes a satellite antenna 114, a satellite 116, and a satellite antenna 118. The satellite antenna 114 may be part of a content distribution system, for example, operated by Dish Network. The network device 102 may cause information to be included in a signal 120 that is transmitted from the satellite antenna 114 to the satellite 116, which retransmits the signal 120 to the satellite antenna 118. The satellite antenna 118 is coupled to the content receiver device 110, which is coupled to the audiovisual device 112. The content receiver device 110 causes information to be displayed on the audiovisual device 112 based on the signal 120 received by the satellite antenna 118. In one or more embodiments, the network device 102 can cause information to be included in a signal that is transmitted via a cable (e.g., coaxial cable) to the content receiver device 110.

Figure 2:
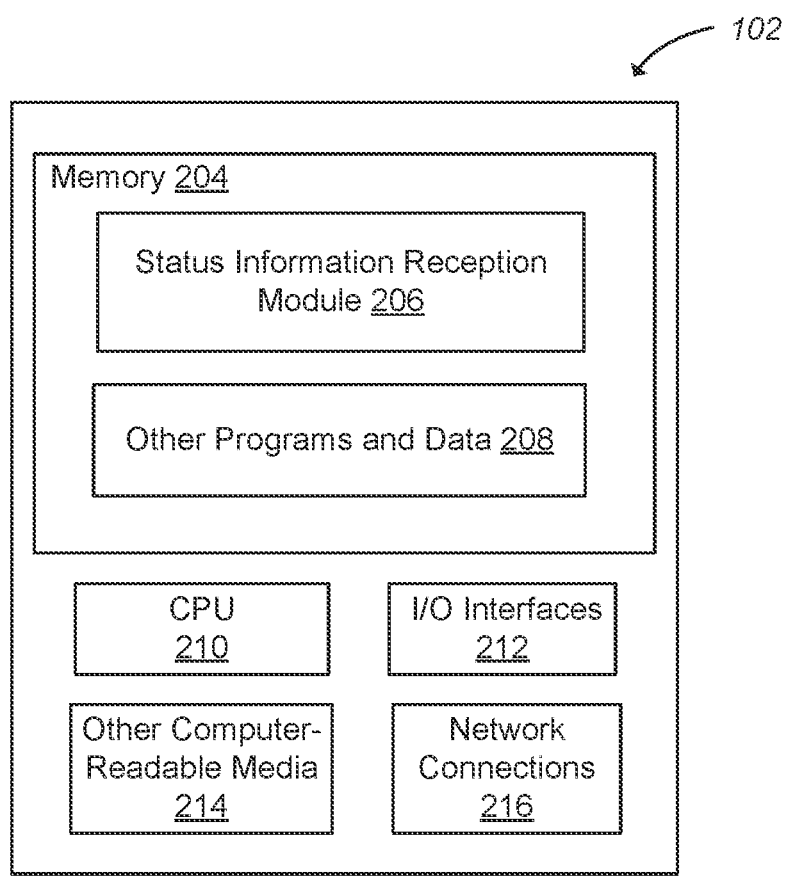
FIG. 2 is a block diagram illustrating a network device in accordance with embodiments described herein.

FIG. 2 is a block diagram illustrating a network device 102 in accordance with embodiments described herein. In some embodiments, one or more special-purpose computing systems may be used to implement the network device 102. Accordingly, various embodiments described herein may be implemented in software, hardware, firmware, or in some combination thereof. The network device 102 may include one or more memory devices 204, one or more central processing units (CPUs) 210, I/O interfaces 212, other computer-readable media 214, and network connections 216.

The one or more memory devices 204 may include one or more various types of non-volatile and/or volatile storage technologies. Examples of the one or more memory devices 204 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 204 may be utilized to store information, including computer-readable instructions that are utilized by the one or more CPUs 210 to perform actions, including those of embodiments described herein.

The one or more memory devices 204 may have stored thereon a status information reception module 206. The status information reception module 206 is configured to implement and/or perform some or all of the functions of the network device 102 described herein. The one or more memory devices 204 may also store other programs and data 208, which may include programs for communicating using Internet Protocol (IP) based protocols, such as User Datagram Protocol (UDP) and Transmission Control Protocol (TCP), programs for operating as a server device such as a web server using the Hypertext Transfer Protocol (HTTP), programs for storing information in and retrieving information from a database using Structured Query Language (SQL), programs for implementing a CXO troubleshooting interface, and programs for remote management and provisioning of customer premises equipment (CPE) using the WAN Management Protocol (CWMP) specified by Technical Report 069 (TR-069) the Broadband Forum, which provides support functions for automatic configuration, software or firmware image management, software module management, status and performance managements, and diagnostics.

Network connections 216 are configured to communicate with other devices including the user device 104 and the content receiver 110. In various embodiments, the network connections 216 include transmitters and receivers, Ethernet connections, and optical fiber connections. I/O interfaces 212 may include a video/display interface, Peripheral Component Interconnect (PCI) interfaces, USB interfaces, and other data input or output interfaces, or the like. Other computer-readable media 214 may include other types of stationary or removable computer-readable media, such as removable flash drives, external hard drives, or the like.

Figure 3:
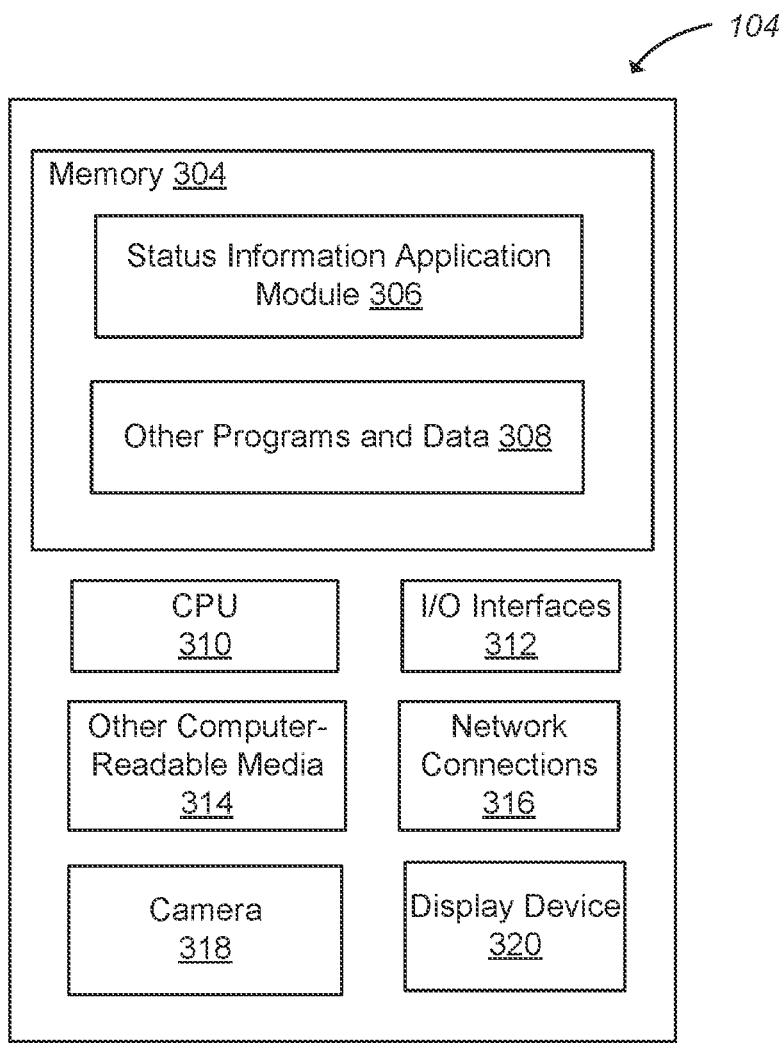
FIG. 3 is a block diagram illustrating a user device in accordance with embodiments described herein.

FIG. 3 is a block diagram illustrating a user device 104 in accordance with embodiments described herein. In some embodiments, one or more special-purpose computing systems may be used to implement the user device 104. Accordingly, various embodiments described herein may be implemented in software, hardware, firmware, or in some combination thereof. The user device 104 may include one or more memory devices 304, one or more CPUs 310, I/O interfaces 312, other computer-readable media 314, network connections 316, a camera 318, and a display device 320.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a status information application module 306. The status information application module 306 is configured to implement and/or perform some or all of the functions of the user device 104 described herein. The one or more memory devices 304 may also store other programs and data 308, which may include programs for operating as a client device such as a web client, programs for communicating using IP based protocols, such as UDP and TCP, for example.

Network connections 316 are configured to communicate with other devices including the network device 102 and the router device 110. In various embodiments, the network connections 316 include transmitters and receivers, and wired connections in accordance with the Institute of Electrical and Electronics Engineers (IEEE) 802.3 communication standards, and wireless connections in accordance with one or more of the IEEE 802.11 communication standards (e.g., 802.12A, 802.12B, 802.11g, 802.11n) or IEEE 802.15 series communication standards (e.g., Bluetooth). I/O interfaces 312 may include a USB interface, Apple Lightning interface, and other data input or output interfaces, or the like. Other computer-readable media 314 may include other types of stationary or removable computer-readable media, such as removable flash drives, external hard drives, or the like.

In one or more embodiments, the camera 318 includes a Charge Coupled Device (CCD) or Complementary Metal Oxide Semi-conductor (CMOS) based sensor and circuitry that converts light intensity levels detected by sensor elements into corresponding pixel values, which are output as pixel values in image data. In various implementations, the camera 318 outputs color image data with pixels values for red, blue, and green pixels. In one or more embodiments, the display device 320 is a Liquid Crystal Display (LCD) device that displays information based on instructions from the one or more CPUs 310. In one or more implementations, the display device 320 includes a touchscreen device.

Figure 4:
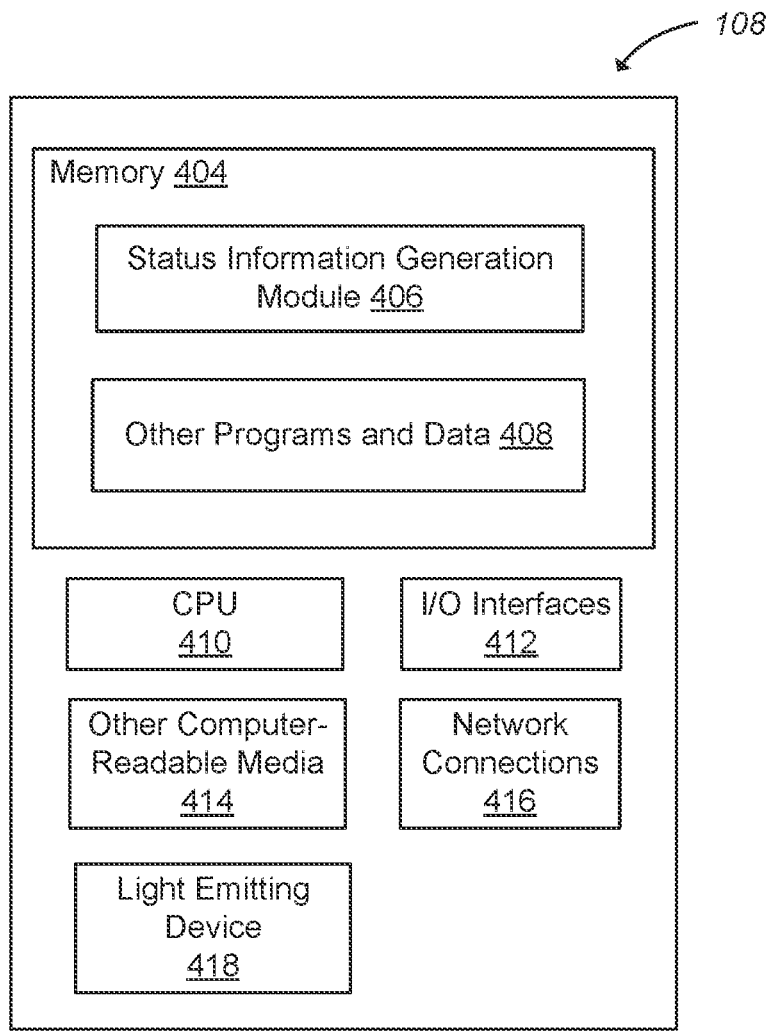
FIG. 4 is a block diagram illustrating a router device in accordance with embodiments described herein.

FIG. 4 is a block diagram illustrating a router device 108 in accordance with embodiments described herein. In some embodiments, one or more special-purpose computing systems may be used to implement the router device 108. Accordingly, various embodiments described herein may be implemented in software, hardware, firmware, or in some combination thereof. The router device 108 may include one or more memory devices 404, one or more CPUs 410, I/O interfaces 412, other computer-readable media 414, network connections 416, and a light emitting device 418.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon a status information generation module 406. The status information generation module 406 is configured to implement and/or perform some or all of the functions of the router device 108 described herein. The one or more memory devices 404 may also store other programs and data 408, which may include programs for operating as a layer 2 or layer 3 switch, programs transmitting and receiving data according to (e.g., using the Ethernet over Coax (EoC) standard, the Data Over Cable Service Interface Specifications (DOCSIS) standard, or the Multimedia over Coax Alliance (MoCA) standard), and programs for communicating using IP based protocols, such as UDP and TCP, for example.

Network connections 416 are configured to communicate with other devices including the network device 102 and the user device 104. In various embodiments, the network connections 416 include transmitters and receivers, wired connections in accordance with the IEEE 802.3 communication standards or the DOCSIS standard, and wireless connections in accordance with one or more of the IEEE 802.11 communication standards (e.g., 802.12A, 802.12B, 802.11 g, 802.11n). I/O interfaces 412 may include a USB interfaces, and other data input or output interfaces, or the like. Other computer-readable media 414 may include other types of stationary or removable computer-readable media, such as removable flash drives, external hard drives, or the like.

In one or more implementations, the light emitting device 418 is a light emitting diode that is normally in a non-illuminated state. If the router device 108 has status information to report to the network device 102, and the router device 108 is not able to communicate with the network device 102 via the network 106, the router device 108 causes the light emitting device 418 to illuminate in an illumination pattern that signals the status information. For example, the router device 108 causes the light emitting device 418 to illuminate in an illumination pattern by causing the light emitting device 418 to turn on for a first duration of time, which corresponds to a "dot" in Morse code, and to turn on for a second duration of time, which corresponds to a "dash" in Morse code, wherein the second duration of time may be three times the first duration of time. The status information that is signaled using the illumination pattern may indicate that an Ethernet port is active, an upload connection is active, a download connection is active, and power stability. Coding formats other than Morse code may be used without departing from that scope of the present disclosure. For example, the status information could be encoded using ASCII binary characters. Regardless of the particular coding format used to encode the status information, a user of the router device 108 is not required to decipher the status information. Instead, the user causes an application on the user device 104 to obtain video of the light emitting device 418 of the router device 108 while it signals the status information, which the application uses to decipher the status information.

Figure 5:
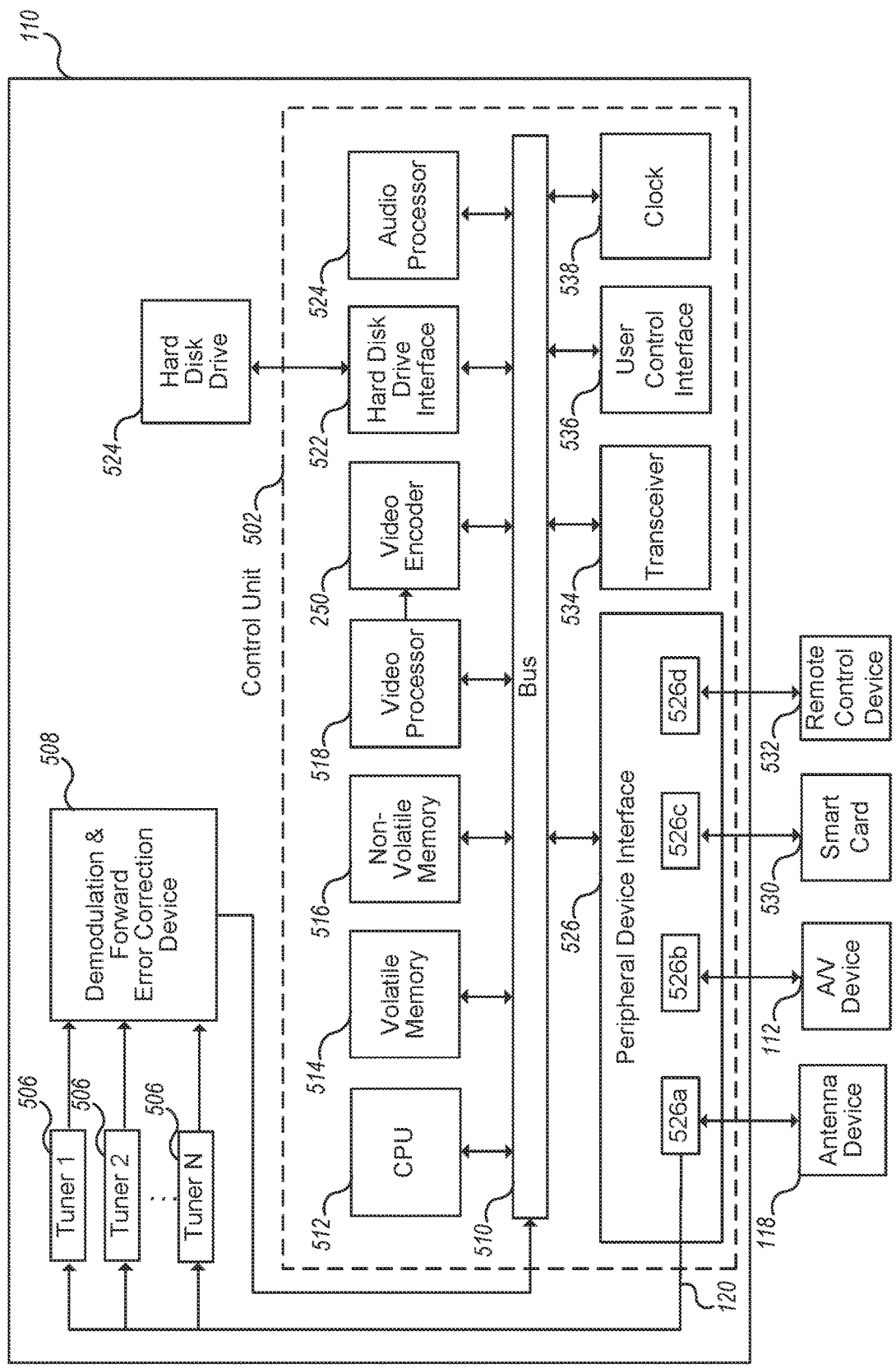
FIG. 5 is a block diagram illustrating a content receiver device in accordance with embodiments described herein.

FIG. 5 is a block diagram illustrating a content receiver device 110 in accordance with embodiments described herein. The content receiver device 110 may be a set-top box or cable or satellite television converter device having DVR functionality, for example.

The signal 120 that is input to the content receiver device 110 is typically processed prior to being output from the content receiver device 110. The content receiver device 110 may include one or more tuner devices 506, which may receive the signal 120 that is transmitted from the satellite antenna 114, retransmitted by the satellite 116, and received by the satellite antenna 118. The tuners 506 may receive commands in the form of signals from a control unit 502. Such commands may cause each of the tuners 506 to tune to a particular frequency band corresponding to a television channel that a user would like to view on a peripheral device and/or would like to record in the content receiver device 110.

The signal 120 may be an analog or a digital signal onto which data is modulated. Signals output from the tuners 506 are provided to a demodulation and forward error correction device 508. The demodulation and forward error correction device 508 demodulates the signal 120 according to known modulation methods to recover the data. Such modulation methods may include amplitude modulation (AM) or frequency modulation (FM). If the data is transmitted in a digital format, the modulation methods may include bi-phase-shift keying (BPSK), quadrature phase-shift keying (QPSK), or eight-phase shift keying (8PSK), for example. The demodulation and forward error correction device 508 also may process the data according to known forward error correction (FEC) methods. Such methods may include inspecting parity bits included in the data.

Signals output from the demodulation and forward error correction device 508 are provided to the control unit 502.

Various components of the control unit 502 may be included in one or more integrated circuits. The control unit 502 may operate under the control of a software program, firmware program, or some other program stored in memory or control logic. The control unit 502 may include fewer, more, or different components from those shown in FIG. 2 and described below.

The control unit 502 includes a shared bus 510 that communicatively couples at least one CPU 512, a volatile memory 514, and a non-volatile memory 516. The non-volatile memory 516 may store control programs that are loaded into the volatile memory 514 and executed by the at least one CPU 512. Additionally, the volatile memory 514 and/or the non-volatile memory 516 may store other data, such as electronic program guide (EPG) data.

The control unit 502 may include at least one video processor 518 that decodes and processes an encoded signal. The video processor 518 may include a graphics processor, a MPEG-2 decoder, and a display compositor with on-screen display (OSD) control for peripheral devices, for example. Also, the control unit 502 may include a video encoder 250 that may work in combination with the video processor 518 to encode the audiovisual signal 120 that is output to one or more peripheral devices, such as the audiovisual device 112, which may be a television, for example. The video encoder 250 may translate a digital stream into a signal according to the NTSC, PAL, or SECAM standards.

The control unit 502 also may include at least one hard disk drive interface 522 and a hard disk drive 524. The hard disk drive interface 522 may provide a standard ATA/ATAPI interface or IDE/EIDE interface for transferring information to and from the hard disk drive 524. The hard disk drive 524 may store recorded programs, buffered data from a program being viewed, EPG data, an operating system, control programs, timers, or other data. The hard drive 532 may be external and connected to the content receiver device 110, for example, using a USB 2.0 or IEEE 1394 (FireWire) connection.

The control unit 502 may be connected to one or more peripheral devices through a peripheral device interface 526. The peripheral device interface 526 include a plurality of interface devices 526a, 526b, 526c, and 526d. For example, the interface device 526a includes an F-Type female coaxial cable connector that is configured to receive a center conductor of a RG6 F-Type coaxial cable and threads configured to mate with threads included in a connector attached to the coaxial cable. For example, the interface device 526b may include an F-Type female coaxial cable connector that is configured to receive a center conductor of a RG59 F-Type coaxial cable and threads configured to mate with threads included in a connector attached to the coaxial cable; three female RCA ports configured to be coupled to two cables for analog audio (e.g., for left and right channels) and one cable for composite analog video, respectively; or a female High-Definition Multimedia Interface (HDMI) configured to be coupled to an HDMI cable. Also, the interface device 526c may be a smartcard connector including a socket into which a smartcard can be inserted. In addition, the interface device 526d may be an infrared transceiver that is configured to communicate by transmitting and receiving infrared signals (e.g., according to Infrared Data Association (IrDA) specifications).

Such peripheral devices may include the antenna device 118, the audiovisual device 112, a smart card device 530, and a remote control device 532. The smart card device 530 may store subscriber account information and/or security information. The remote control device 532 may wirelessly transmit signals to the content receiver device 110 using UHF or IR communications. Such signals may indicate a television channel, which will cause the control unit 502 to change the frequency band to which one of the tuners 506 is tuned, process the signal output from that tuner 506, and provide the processed signal to a coaxial cable connector included in the peripheral device interface 526, which is connected to a coaxial cable that also is connected to the audiovisual device 112, for example. Although only one audiovisual device 112 is shown in FIG. 2, the peripheral device interface 526 may provide connections to more than one audiovisual device 112. The audiovisual device 112 may display graphical information corresponding to television programming content and/or user interface screens provided by the content receiver device 110. Additionally, the audiovisual device 112 may output sounds corresponding to the television programming content or user interfaces.

The content receiver device 110 also includes a transceiver 534 that is configured to transmit and receive information from the network 106. For example, the content receiver device 110 may utilize a modem to transmit data used to order pay-per-view programming or to receive EPG data using a standard telephone cable that is attached to the peripheral device interface 526 using a RJ-11 style connector. In one or more embodiments, the transceiver 534 is coupled to an eight-pin RJ45 connector configured to be coupled to an Ethernet cable through which messages transmitted to and received from the network 106. In one or more implementations, the transceiver 534 is configured to transmit and receive data signals in accordance with the Institute of Electrical and Electronics Engineers (IEEE) 802.3 communication standards. In one or more embodiments, the transceiver 534 includes at least one antenna that is configured to transmit and receive wireless signals in a particular RF band (e.g., 2.4 gigahertz (134 millimeter) ultra high frequency (UHF) band, or 5 gigahertz (60 millimeter) super high frequency (SHF) band). The transceiver 534 may be configured to transmit and receive RF signals via the at least one antenna in accordance with one or more of the IEEE 802.11 communication standards (e.g., 802.12A, 802.12B, 802.11g, 802.11n). The transceiver 534 may be configured to transmit and receive signals in accordance with other communication standards without departing from the scope of the present disclosure.

The control unit 502 may include a user control interface 536. The user control interface 536 may receive signals from buttons and/or a keypad of the content receiver device 110. For example, a user may operate the keypad to power the content receiver device 110 on and off, and to change the channel of the programming content that is being output from the peripheral device interface 526.

The content receiver device 110 also may include a clock 538. The clock 538 outputs a signal indicative of the current date and time. For example, the at least one CPU 512 may utilize the output from the clock 538 to determine whether to begin or to end recording of programming content. Additionally, the at least one CPU 512 may utilize the output from the clock 538 to determine what television program is currently being broadcast on a particular channel. For example, the content receiver device 110 may store EPG data or other scheduling information that identifies the television programs scheduled to be broadcast on each channel during a particular time period, which may include a start time, an end time, a title, a category, a type, and a textual description of each television program. The at least one CPU 512 may use the output from the clock 538 and a channel identifier to determine the title or other unique identifier of the television program that is scheduled to be broadcast on a channel at the current time.

Figure 6:
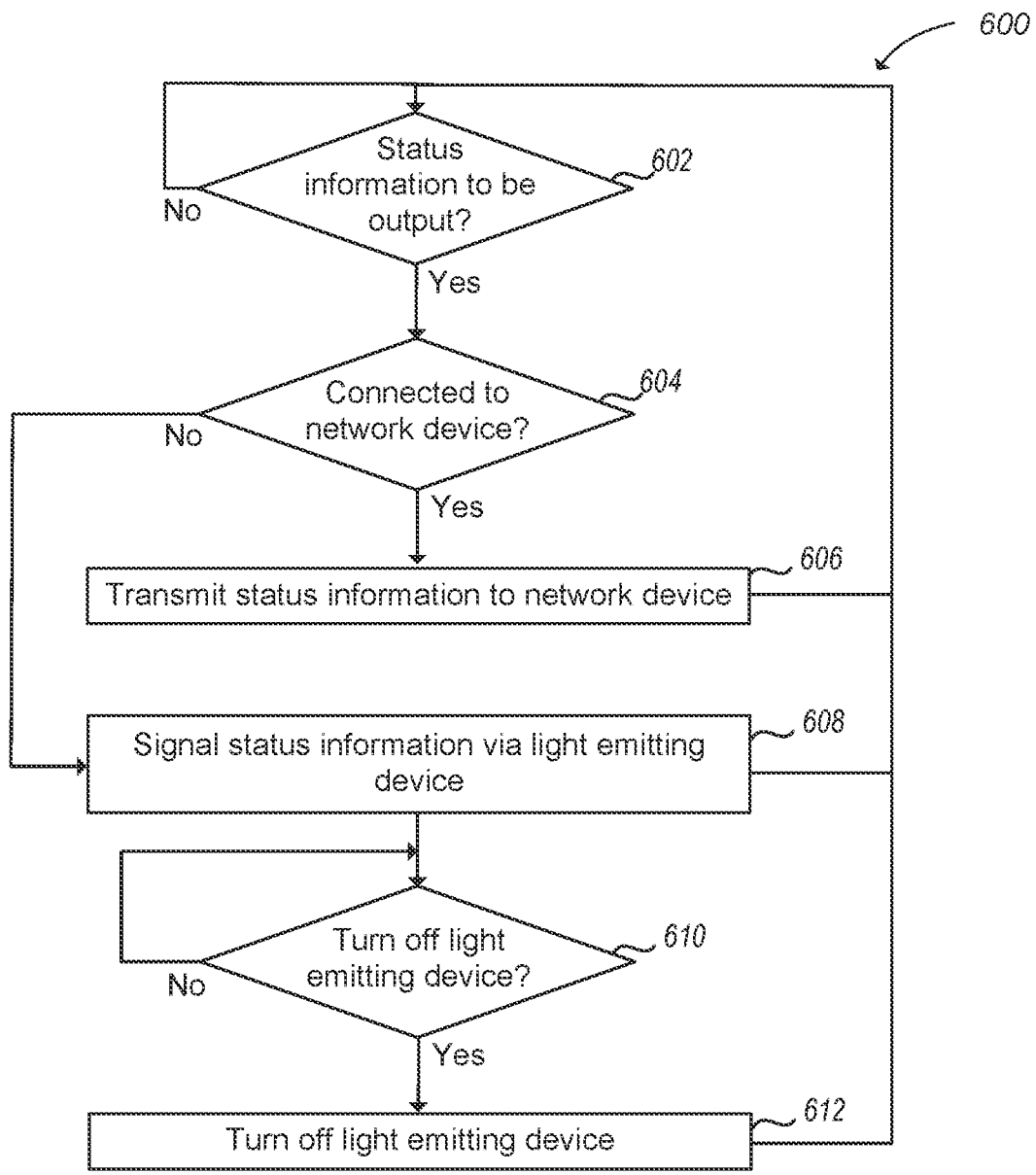
FIG. 6 illustrates a logical flow diagram showing an example of a process performed by a router device in accordance with embodiments described herein.

FIG. 6 illustrates a logical flow diagram showing an example of a process 600 performed by a router device in accordance with embodiments described herein. The process 600 begins at 602.

At 602, the router device determines whether status information is to be output. If the router device determines "No" status information is not to be output, the process 600 then returns to 602. If the router device determines "Yes" status information is to be output, the process 600 then proceeds to 604.

For example, at 602, the one or more memory devices 404 of the router device 108 store variables corresponding to different states or statuses of the router device 108, and corresponding values of those variables that trigger outputting status information. For example, the one or more memory devices 404 of the router device 108 store a variable FIRMWARE_CORRUPTED and a corresponding value TRUE, and the router device 108 causes status information to be output in response to the variable FIRMWARE_CORRUPTED being assigned the value of TRUE. By way of another example, for a router device 108 that communicates with the network 106 using a modem device, the one or more memory devices 404 of the router device 108 store a variable MODEM_CONNECTED and a corresponding value FALSE, and the router device 108 causes status information to be output in response to the variable MODEM_CONNECTED being assigned the value of FALSE. Additionally or alternatively, the router device 108 may periodically transmit status information, and may determine that status information is to be output in response to the expiration of a timer, which is reset each time that status information is output.

At 604, the router device determines whether it is connected to a network device. If the router device determines "No" it is not connected to the network device, the process 600 then proceeds to 608. If the router device determines "Yes" it is connected to the network device, the process 600 then proceeds to 606.

For example, at 604, the router device 108 attempts to transmit a request message to the network device 102 via the network 106. If the router device 108 receives a response message from the network device 102 in response to the request message, the router device determines that it is connected to the network device 102. If the router device 108 does not receive a response message from the network device 102 in response to the request message within a predetermined amount of time (e.g., 1 minute), the router device determines that it is not connected to the network device 102.

At 606, the router device transmits status information to a network device. For example, at 606, the router device 108 transmits one or more messages based on TR-069 to the network device 102 via the network 106. The process 600 then returns to 602.

At 608, the router device signals the status information via a light emitting device. For example, at 608, the router device 108 causes the light emitting device 418 to turn on an off in an illumination pattern corresponding to the status information. The process 600 then returns to 602.

At 610, the router device determines whether to turn off the light emitting device. If the router device determines "No" the lighting device is not to be turned off, the process 600 then returns to 610. If the router device determines "Yes" the lighting device is to be turned off, the process 600 then proceeds to 612.

For example, at 610, the router device 108 attempts to transmit a request message to the network device 102 via the network 106. If the router device 108 receives a response message from the network device 102 in response to the request message, the router device 108 determines that the light emitting device 418 is to be turned off. If the router device 108 does not receive a response message from the network device 102 in response to the request message within a predetermined amount of time (e.g., 1 minute), the router device 108 determines that the light emitting device 418 is not to be turned off.

At 612, the router device determines turns off the light emitting device. For example, the router device 108 causes a switch that is electrically coupled between a power supply terminal and the light emitting device 418 to be in a nonconductive state so that power is not supplied to the light emitting device 418. The process 600 then returns to 602.

Figure 7A:
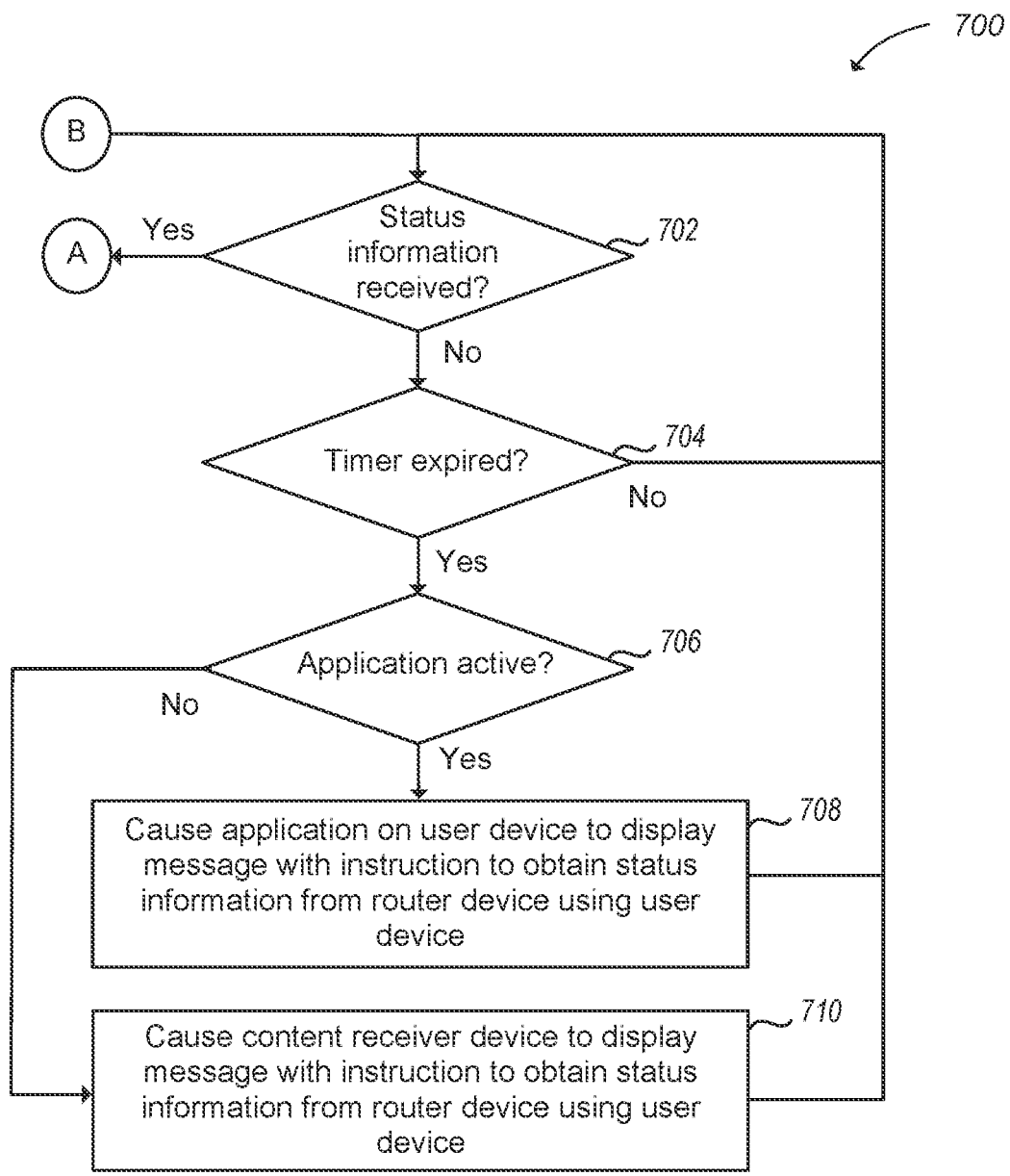
FIGS. 7A and 7B illustrate a logical flow diagram showing an example of a process performed by a network device in accordance with embodiments described herein.
Figure 7B:
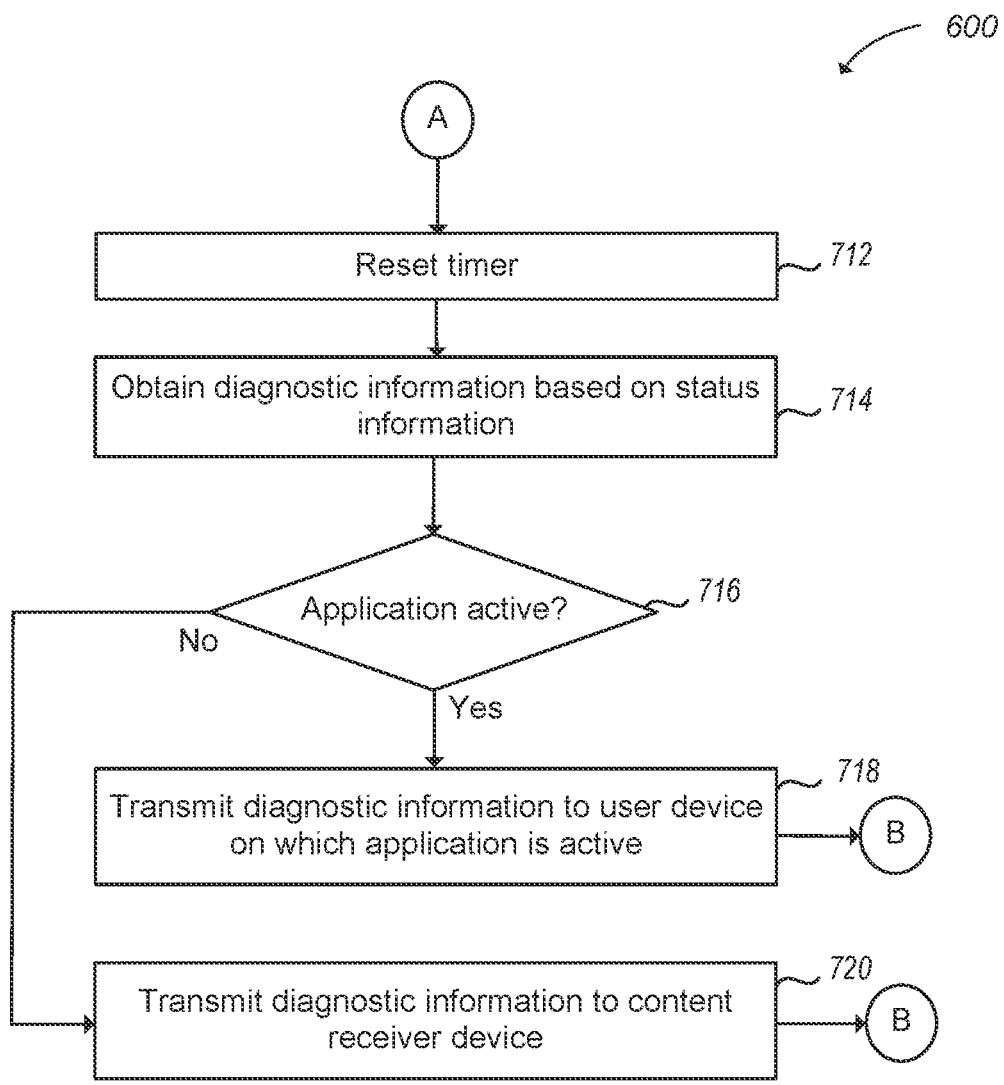

FIGS. 7A and 7B illustrate a logical flow diagram showing an example of a process 700 performed by a network device in accordance with embodiments described herein. The process 700 begins at 702.

At 702, the network device determines whether status information has been received from a router device. For example, at 702, the network device 102 determines whether status information has been received from the router device 108 via the network connections 216. If the network device 102 determines "No" status information has not been received from the router device 108, the process 700 proceeds to 704. If the network device 102 determines "Yes" status information has been received from the router device, 108 the process 700 proceeds to 712.

At 704, the network device determines whether a timer has expired. If the network device determines "No" the timer has not expired, the process 700 then returns to 702. If the router device determines "Yes" the timer has expired, the process 700 proceeds to 706.

For example, each time that status information is received from the router device 108, the router device resets a timer corresponding to the router device 108. At 704, the network device 102 may determine whether an operating system running on the router device 108 has output a signal indicating that the timer corresponding to the router device 108 has expired.

At 706, the network device determines whether an application installed on a user device is active. If the network device determines "No" the application installed on the user device is not active, the process 700 proceeds to 710. If the router device determines "Yes" the application installed on the user device is active, the process 700 proceeds to 708.

For example, while an application (e.g., MyDISH app) is active (e.g., currently executing) on the user device 104, the application causes the user device 104 to periodically transmit a heartbeat message to the network device 102 via the network 106. The network device 102 may store a value corresponding to the time that the last heartbeat message was received from the user device 104. At 706, the network device 102 obtains a value corresponding to the current time and compares it with the stored value corresponding to the time that the last heartbeat message was received from the user device 104. If a result of comparing those values is that greater than or equal to a predetermined amount of time (e.g., 1 minute) has passed since the last heartbeat message was received from the user device 104, the network device 102 determines that the application is not active. If the result of comparing those values is that less than the predetermined amount of time (e.g., 1 minute) has passed since the last heartbeat message was received from the user device 104, the network device 102 determines that the application is active.

At 708, the network device causes the application installed on the user device to display a message with an instruction to obtain status information from the user's router device using the application on the user device. For example, the network device 102 transmits to the user device 104 via the network 106 a message with an instruction or request to aim the camera 316 of the user device 104 at the light emitting device 418 of the router device 108, and select an icon displayed on the display device 320 by the application in order to cause the application to obtain image data corresponding to a plurality of images of the light emitting device 418 and obtain status information based on the image data. The process 700 then returns to 702.

At 710, the network device causes a content receiver device to display a message with an instruction to obtain status information from the user's router device using the application on the user device. For example, the network device 102 transmits to the content receiver device 110 via the satellite 116 a message with an instruction or request to aim the camera 316 of the user device 104 at the light emitting device 418 of the router device 108, and select an icon displayed on the display device 320 by the application in order to cause the application to obtain image data corresponding to a plurality of images of the light emitting device 418 and obtain status information based on the image data. In one or more implementations, the message is stored by the memory 516 of the content receiver device 110 and, at 710, the network device 102 transmits to the content receiver device 110 via the satellite 116 a message including a field set to a value (e.g., "1") that instructs the content receiver device 110 to output the message to the audiovisual device 112. The process 700 then returns to 702.

At 712, the network device resets a timer. For example, at 712, the network device 102 issues an instruction that causes a timer maintained by an operating system of the network device 102 and associated with an identifier of the router device 108 (e.g., serial number, IP address, etc.) to reset. The process 700 then proceeds to 714.

At 714, the network device obtains diagnostic information based on the status information that was determined to have been received at 702. The process 700 then proceeds to 716.

For example, at 714, the network device 102 queries a database of diagnostic information using at least some of the status information. For example, the status information includes a plurality of error codes or values that the network device 102 uses to query a database, which returns diagnostic information including text corresponding to an explanation of the meaning of each error code or value. By way of another example, the network device 102 uses a code included in the status information, which indicates that an Ethernet port of the router device 108 used to couple the router device 108 to the network 106 is not active, to query a database, and the database returns diagnostic information including text corresponding to a message indicating that the user should check to make sure that an Ethernet cable is plugged into the Ethernet port.

At 716, the network device determines whether the application installed on the user device is active. For example, the network device 102 determines whether the application installed on the user device 102 is active in a manner similar to that described above in connection with 706. If the network device determines "No" the application installed on the user device is not active, the process 700 proceeds to 720. If the router device determines "Yes" the application installed on the user device is active, the process 700 proceeds to 718.

At 718, the network device transmits the diagnostic information obtained at 714 to the user device on which the application is active. For example, the network device 102 transmits to the user device 104 via the network 106 a message including the diagnostic information. The process 700 then returns to 702.

At 720, the network device transmits the diagnostic information obtained at 714 to the content receiver device. For example, the network device 102 transmits to the content receiver device 110 via the satellite 116 a message including the diagnostic information, which the content receiver device 110 causes to be displayed on the audiovisual device 110. The process 700 then returns to 702.

Figure 8:
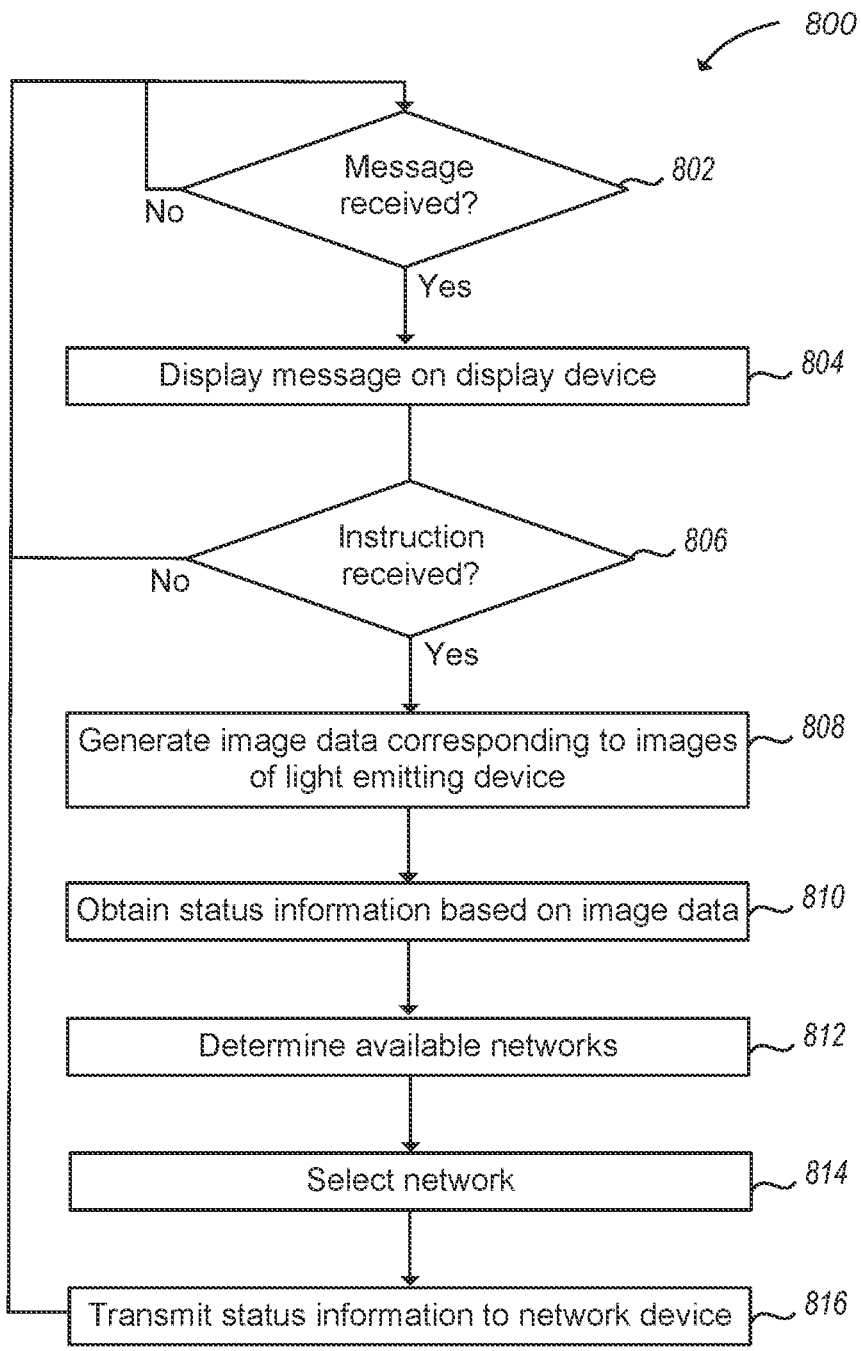
FIG. 8 illustrates a logical flow diagram showing an example of a process performed by a user device in accordance with embodiments described herein.

FIG. 8 illustrates a logical flow diagram showing an example of a process 800 performed by a user device in accordance with embodiments described herein. The process 800 begins at 802.

At 802, the user device determines whether a message has been received from a network device. For example, at 802, the user device 104 determines whether a message has been received from the network device 102 via the network connection 316. If the user device 104 determines "No" a message has not been received from the network device 102, the process 800 returns to 802. If the user device 104 determines "Yes" a message has been received from the network device 102, the process 800 proceeds to 804.

At 804, the user device displays the message on a display device. For example, at 804, the one or more CPUs 310 of the user device 104 causes the display device 320 to display the message. In one or more implementations, the message indicates there is a potential issue with the router device 108 and requests the user to aim the camera device 318 of the user device 104 at the light emitting device 418 of the router device 108 while the light emitting device 418 outputs light in an illumination pattern, and then use the application to capture images of the light emitting device of the router device. In one or more implementations, the message includes information that identifies the router device (e.g., manufacturer, model, serial, image of the router device, room in which the router is located, etc.). The process 800 then proceeds to 806.

At 806, the user device determines whether an instruction to obtain status information is received. For example, at 806, the display device 320 includes a touchscreen device and the one or more CPUs 310 of the user device 104 determines whether a user has touched the touchscreen device at a location corresponding to a predetermined icon displayed by the display device 320. If the user device 104 determines "No" an instruction to obtain status information has not been received, the process 800 returns to 802. If the user device 104 determines "Yes" an instruction to obtain status information has been received, the process 800 proceeds to 808.

At 808, the user device generates image data corresponding to images of a light emitting device. For example, at 808, the user causes the camera device 318 of the user device 104 to be aimed at the light emitting device 418 of the router device 108, and the one or more CPUs 310 of the user device 104 cause the camera device 318 to generate image data corresponding to a plurality of images of light emitting device 418 while light emitting device 418 outputs light in an illumination pattern corresponding to status information. The process 800 then proceeds to 810.

At 810 the user device obtains status information based on the image data generated at 808. For example, at 810, the user causes the camera device 318 of the user device 104 to be aimed at the light emitting device 418 of the router device 108, and the one or more CPUs 310 of the user device 104 causes the camera device 318 to obtain image data, process the image data by determining a plurality of periods in which the light emitting device 418 is illuminated and a plurality of periods in which the light emitting device 418 is not illuminated, determine a plurality of "dots" and "dashes" based on those periods, interpret the plurality of "dots" and "dashes" based on Morse code, and store corresponding status information in the one or more memory devices 304 of the user device 104. The process 800 then proceeds to 812.

At 812, the user device determines available networks for communicating with the network device. For example, at 812, the user device 104 determines networks that are available for communicating with the network device 102 based on information provided by the network connections 316 of the user device 104. The process 800 then proceeds to 814.

At 814, the user device selects a network for communicating with the network device. For example, at 814, the user device 104 displays information for two networks including a cellular network connected to the user device 104 and a WiFi network connected to the user device 104 (e.g., from an Internet gateway provided by a mobile cellular hotspot device or an automobile). In one or more implementations, the display device 320 includes a touchscreen device, the display device 320 displays icons or selectable text corresponding to the available network(s) identified at 812, and the one or more CPUs 310 of the user device 104 selects an available network based on a location where a user has touched the touchscreen device. In one or more implementations, the one or more CPUs 310 of the user device 104 receives information from the network connections 316 including a plurality of network identifiers and a plurality of associated statuses indicating whether the respective networks identified by the network identifiers are connected to an external network (e.g., the Internet), and the one or more CPUs 310 automatically selects a network that is associated with a status indicating that the network is connected to the Internet. The process 800 then proceeds to 816.

At 816, the user device transmits the status information obtained at 808 to the network device using the network selected at 814. For example, at 816, the user device 104 transmits the status information to the network device 102 via a cellular network. The process 800 then returns to 802.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of obtaining status information, the method comprising:
    transmitting, by a router device, first status information to a network device;
    determining, by the router device, that the router device is not connected to the network device;
    causing, by the router device, a light emitting device to output light in an illumination pattern in response to the determining that the router device is not connected to the network device;
    generating, by a user device that is separate from the network device, image data corresponding to a plurality of images of the light emitting device while the light emitting device outputs light in the illumination pattern;
    obtaining, by the user device, second status information based on the image data corresponding to the plurality of images of the light emitting device while the light emitting device outputs light in the illumination pattern; and
    transmitting, by the user device, the second status information to the network device.

2. The method of claim 1, further comprising:
    obtaining, by the network device, diagnostic information based on the second status information; and
    transmitting, by the network device, the diagnostic information.

3. The method of claim 2, further comprising:
    receiving, by the user device, the diagnostic information transmitted by the network device; and
    displaying, by the user device, a message based on the diagnostic information.

4. The method of claim 2, further comprising:
    receiving, by a content receiver device, the diagnostic information transmitted by the network device, wherein the diagnostic information is transmitted via a satellite; and
    causing, by the content receiver device, a display device to display a message based on the diagnostic information.

5. The method of claim 1, further comprising:
    receiving, by the network device, the first status information transmitted by the router device;
    determining, by the network device, that more than a predetermined amount of time has passed after the receiving the first status information transmitted by the router device; and
    transmitting, by the network device, a message in response to the determining that more than the predetermined amount of time has passed after the receiving the first status information transmitted by the router device.

6. The method of claim 5, further comprising:
    determining, by the network device, that an application is active on the user device,
    wherein the transmitting the message includes transmitting the message to the user device in response to determining that the application is active on the user device.

7. The method of claim 5, further comprising:
    determining, by the network device, that an application is not active on the user device,
    wherein the transmitting the message includes transmitting the message to a content receiver device via a satellite in response to determining that the application is not active on the user device.

8. The method of claim 1, further comprising:
    receiving, by the router device, a message transmitted by the network device; and
    causing, by the router device, the light emitting device to turn off in response to the receiving the message transmitted by the network device.

9. A network device comprising:
one or more processors; and
one or more memory devices storing instructions that, when executed by the one or more processors, cause the network device to:
receive first status information from a router device;
determine that more than a predetermined amount of time has passed after the receiving the first status information from the router device;
transmit a first message to a user device or a content receiver device in response to determining that more than the predetermined amount of time has passed after the receiving the first status information from the router device,
wherein the user device and the content receiver device are different from the router device, and
wherein the first message requests a user to aim a camera device of the user device at a light emitting device of the router device.

10. The network device of claim 9 wherein the instructions,
when executed by the one or more processors, cause the network device to:
receive second status information from the user device;
obtain diagnostic information based on the second status information received from the user device; and
transmit the diagnostic information to the user device or the content receiver device.

11. The network device of claim 10 wherein the instructions, when executed by the one or more processors, cause the network device to:
determine that an application is active on the user device,
wherein the diagnostic information is transmitted to the user device in response to determining that the application is active on the user device.

12. The network device of claim 10 wherein the instructions, when executed by the one or more processors, cause the network device to:
determine that an application is not active on the user device,
wherein the diagnostic information is transmitted to the content receiver device in response to determining that the application is not active on the user device.

13. The network device of claim 10 wherein the instructions, when executed by the one or more processors, cause the network device to:
transmit a second message to the router device after the second status information is received from the user device, wherein the second message causes the router device to turn off the light emitting device.

14. The network device of claim 9 wherein the instructions, when executed by the one or more processors, cause the network device to:
set or reset a timer in response to receiving the first status information from the router device.

15. A non-transitory processor-readable storage medium storing instructions that, when executed by at least one processor, cause a device to:
generate image data corresponding to a plurality of images of a light emitting device while the light emitting device outputs light in an illumination pattern;
obtain status information based on the image data;
determine one or more networks available to transmit the status information to the network device;
select one of the one or more networks available to transmit the status information to the network device, wherein the status information is transmitted to the network device using the one of the one or more networks available to transmit the status information to the network device, including:
automatically select the one of the one or more networks based on information indicating that the one of the one or more networks is connected to an external network; and
transmit the status information to the network device, including:
automatically transmit the status information to the network device after the one or more networks is automatically selected.

16. The storage medium of claim 15 wherein the instructions, when executed by the at least one processor, cause the device to:
receive a message from the network device; and
display the message received from the network device,
wherein the message requests a user to aim a camera device at the light emitting device while the light emitting device outputs light in the illumination pattern.

17. The storage medium of claim 16 wherein the message includes information that identifies a device that includes the light emitting device.

18. The storage medium of claim 15, wherein the instructions, when executed by the at least one processor, cause the device to:
receive, from the network device, diagnostic information based on the status information; and
display a message based on the diagnostic information.

* * * * *